Patented Oct. 16, 1951

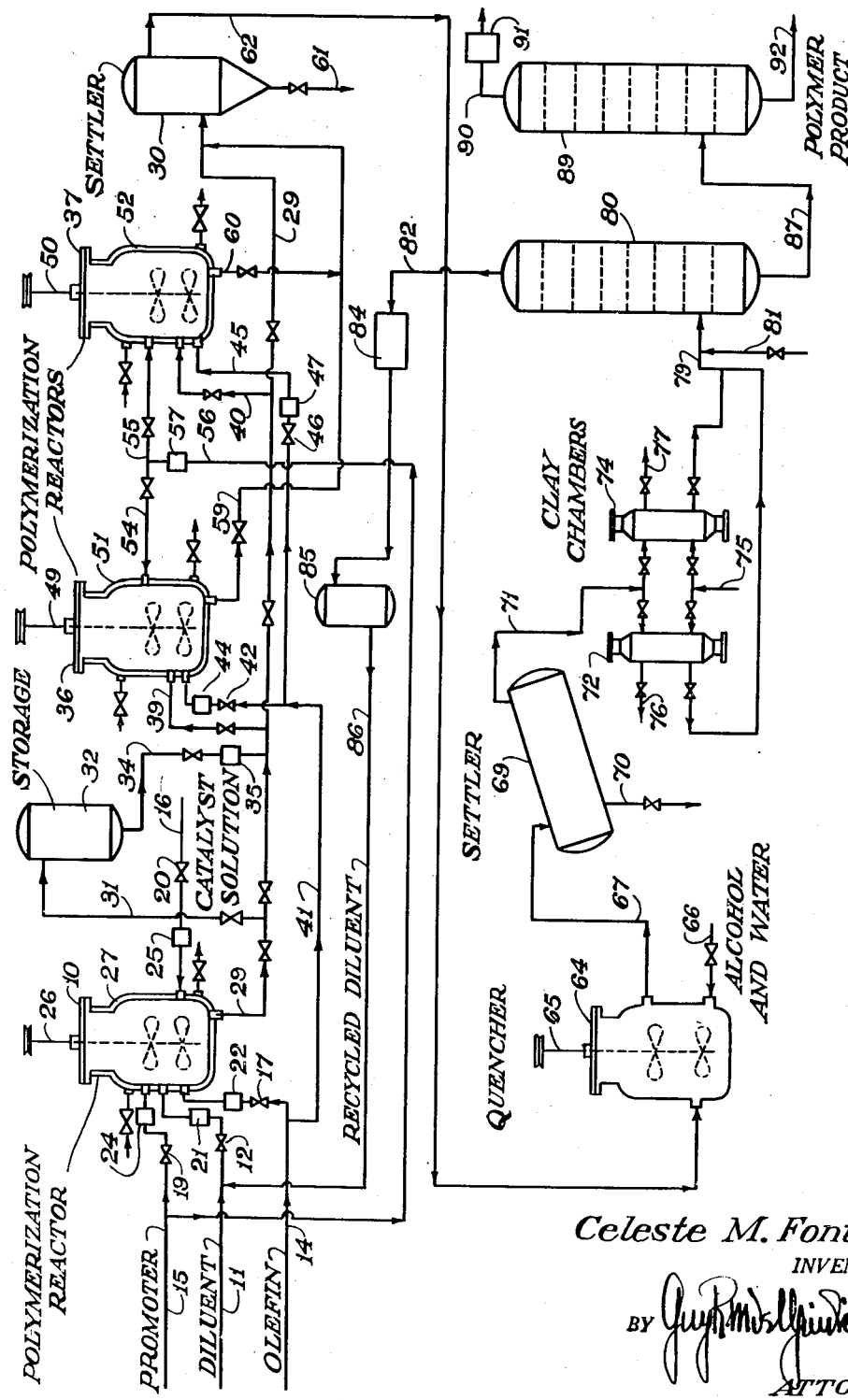

2,571,354

UNITED STATES PATENT OFFICE 2,571,354

POLYMERIZATION OF MONOALKYL-
ETHYLENES

Celeste M. Fontana, Pitman, N. J., assignor to
Socony-Vacuum Oil Company, Incorporated, a
corporation of New York Application January 22, 1949, Serial No. 72,138

10 Claims. (Cl. 260—683.15)

1

This invention relates to the polymerization of olefins and relates more particularly to the polymerization of monoalkylethylenes to produce high viscosity polymer products.

It is known that propylene and other low-boiling monoalkylenes may be polymerized in the presence of metal halide catalysts to produce polymer products of varying viscosity within the lubricating oil range. It has been desired to obtain polymer products of high viscosity from the low-boiling monoalkylethylenes, and particularly from propylene because of its availability and low cost, in order to provide agents for blending with oil base stocks to increase the viscosity and viscosity index of the base stocks. To be satisfactory, these blending agents should have very high viscosities and small changes in viscosity with change of temperature, and while satisfactory polymer products have been produced from isobutene and higher iso-olefins, satisfactory products have not been obtained from proplyene and other low-boiling monoalkylethylenes.

It is an object of this invention to provide a process for the polymerization of monoalkylethylenes. It is another object of this invention to provide polymer products having improved viscosity and viscosity-temperature characteristics from monoalkylethylenes. It is another object of this invention to provide blending agents from propylene. It is another object of this invention to provide blending agents from 1-butene. It is another object of this invention to provide improved polymer products from propylene, 1-butene and other monoalkylethylenes. It is still another object to provide mineral lubricating oils containing, in viscosity index improving amounts, the improved polymer products referred to hereinbefore. Other objects of the invention will become apparent from the following description thereof.

In accordance with the invention, polymer products having improved viscosity and viscosity-temperature characteristics are obtained by polymerizing monoalkylethylenes in the presence of dissolved aluminum bromide catalyst and catalyst promoter under conditions of low instantaneous concentration of unpolymerized olefin and free catalyst followed by conditions conducive to maximum growth of polymer chains. More particularly, the desired polymer products are obtained by simultaneously admixing monoalkylethylene and aluminum bromide solution in the presence of a catalyst promoter to produce a polymerization reaction mixture as a first step and thereafter, as a second step, adding mono-

2 alkylethylene slowly to the polymerization reaction mixture. I have found that, by carrying out the polymerization of monoalkylethylenes in this manner, polymer products of higher viscosity may be obtained than are obtained by processes heretofore employed. For example, I have obtained propylene polymer products, in substantially one hundred per cent yield, having a viscosity at 210° F. in excess of 6,300 Saybolt Universal seconds. Apparently, the combination of low instantaneous concentrations of unpolymerized olefin and catalyst in the first step and opportunity for polymer chains to grow in the the second step provides the essential condition for the production of high viscosity polymers having improved temperature-viscosity characteristics.

In the first step of the reaction the essential condition is that both olefin monomer and fresh aluminum bromide solution, i. e., aluminum bromide solution which has not yet entered into reaction with olefin monomer, be present in low concentrations in the polymerization reaction mixture. This condition is obtained by simultaneous admixture of separate streams of olefin and aluminum bromide solution. The rate at which each stream enters the reactor is important only in that high instantaneous concentrations of either olefin monomer or fresh aluminum bromide solution, such as would be obtained by passing a stream of olefin to a reactor filled with fresh aluminum bromide solution or by passing a stream of aluminum bromide solution to a reactor filled with olefin, are avoided and, therefore, variation is permitted in the rate of addition of each stream to the polymerization reactor. Satisfactory results have been obtained where, for the total ratio of olefin to aluminum bromide solution admixed in the first step, the rate of addition of each stream to the reactor is such that the mole ratio of total olefin to total aluminum bromide added to the reaction mixture divided by the residence time is less than four per minute, or preferably, less than two per minute. By residence time in the first step I mean the time the reaction mixture is in the reactor and aluminum bromide solution and olefin are being added thereto.

Catalyst promoter is present in the mixture during the first step of the reaction and the promoter may be introduced into the mixture in any manner desired. For example, the promoter may be introduced into the mixture by admixing it simultaneously with the olefin and the solution of aluminum bromide during the entire first step or by admixing it with the olefin and solution of aluminum bromide at the beginning of the first step and discontinuing admixture thereafter or adding further promoter intermittently during the remaining portion of the first step. Hydrogen bromide is preferably employed as promoter. However, any suitable promoter may be employed such as the bromo-alkanes containing at least three carbon atoms including propyl, isopropyl, butyl, isoamyl, etc., bromoalkanes, and compounds which react under the conditions of the reaction, for example, by reaction with aluminum bromide, to produce hydrogen bromide are also effective.

For the second step of the reaction, a stream of olefin is added to the polymerization reaction mixture produced in the first step. This second step is carried out under conditions such that polymer chains started in the first step and present in the reaction mixture are permitted to grow to a maximum at the expense of the olefin added thereto. This condition is obtained by maintaining a low instantaneous concentration of olefin monomer in the reaction mixture, and a low instantaneous concentration of olefin monomer is obtained by adding the olefin slowly to the reaction mixture. Satisfactory results may be obtained by adding the olefin to the reaction mixture at a rate not greater than about four, and preferably not greater than two, moles of olefin per minute per mole of aluminum bromide contained in the reaction mixture. The lowest practical limit of rate of addition of olefin will be about 0.05 mole of olefin per minute per mole of aluminum bromide. In this second step of the reaction, promoter may be added continuously or intermittently to the reaction mixture. However, promoter need not be employed in the second step and addition of promoter, therefore, to the reaction mixture may be discontinued after the completion of the first step.

Olefin may be added immediately to the polymerization reaction mixture in the polymerization reaction zone for the second step or the mixture may be kept in storage until needed. In operations of a continuous nature, such as would be employed in large scale production of polymer product, the polymerization reaction mixture may be prepared continuously and a stream of reaction mixture withdrawn continuously from the reaction zone and passed to a separate reaction zone until the desired amount has been added. Thereafter, the stream can be passed to another separate reaction zone, and these operations continued for as many separate reaction zones as desired. The olefin is then added to the polymerization reaction mixture in each of the separate reaction zones and when the reaction has been completed in each zone, the reactor may be emptied to receive fresh polymerization reaction mixture. Where the polymerization reaction mixture is kept in storage between the first and second steps of the reaction, the mixture should be maintained at low temperatures to prevent loss of active aluminum bromide. Satisfactory results have been obtained where the reaction mixture has been kept in storage at temperatures below about −10° C.

The total ratio of olefin and aluminum bromide solution to be employed in the first step of the reaction is generally about 20 moles of olefin per mole of aluminum bromide. A higher ratio may be used if desired, although it is preferred to employ a ratio not greater than about ½ or ⅓ of the total ratio of olefin to catalyst to be employed for both the first and second steps. A lower ratio may also be employed. However, at a ratio below about 10 to 1, the polymerization reaction mixture does not keep satisfactorily on storage, the catalyst tending to precipitate with apparently the effect of stopping chain growth when olefin is subsequently added thereto. Accordingly, when a ratio below about 10 to 1 is employed, it is preferred to use the polymerization reaction mixture immediately for the second step of the reaction.

Only olefin need be added to the polymerization reaction mixture in the second step of the reaction. Accordingly, the conditions of aluminum bromide concentration and promoter concentration in the second step can be governed by the conditions in the first step of the reaction, although, as mentioned hereinabove, promoter may be added to the reaction mixture during the second step. Conditions of temperature and pressure may be the same or different than those in the first step of the reaction. If desired, a different olefin may be added to the polymerization reaction mixture in the second step than is employed in the first step.

A particular advantage of the present invention resides in the high ratio of the amount of olefin that may be polymerized to the amount of aluminum bromide catalyst employed. I have discovered that the molecular weight of the polymer product is a function of the ratio of the total amount of olefin added to the amount of aluminum bromide catalyst in the reaction mixture and that the molecular weight increases as the ratio increases until a maximum is reached after which the molecular weight decreases with increasing ratio. By the present invention, between 100 and 120 to 130 moles of olefin may be polymerized per mole of aluminum bromide catalyst to provide polymer product of maximum molecular weight.

Aluminum bromide solution is prepared by dissolving the solid compound in a solvent having no deleterious effect on the polymerization reaction. Saturated hydrocarbons are preferred as solvents. Examples of suitable saturated hydrocarbon solvents are ethane, propane, normal butane, etc. Mixtures of one or more solvents may also be employed, of desired, for preparing the solution of aluminum bromide.

It is preferred to carry out the polymerization reaction in the presence of a diluent for the olefin. The saturated hydrocarbons employed as solvents for the catalyst are satisfactory as diluents. If desired, mixtures of hydrocarbons may be used as diluents. It will be convenient to employ the same hydrocarbon as diluent and as solvent, in order to simplify the later procedures of recovering the diluent and solvent for reuse. The diluent may be employed admixed with the olefin, or part or all of the diluent may be admixed with the catalyst solution, whether or not the same type of hydrocarbon is used as solvent and as diluent. Where all the diluent is mixed with the catalyst solution, the mixture will serve in the capacity of both catalyst solution and diluent.

The amount of solvent and diluent may be the same as conventionally employed in olefin polymerization reactions. Amounts of solvent and diluent to give a ratio of between about 2 and 8 moles per mole of olefin as a minimum at any stage of the reaction will be satisfactory. However, larger or smaller ratios may be employed, if desired.

Following completion of the second step of the reaction, the reaction mixture may be treated in accordance with conventional procedures for inactivation of the aluminum bromide, removal of solvent and diluent, and recovery of polymer product. For example, the reaction mixture may be admixed with water, alkali, alcohol, alcohol and water, or the like to inactivate the catalyst, after which the inactivating agent may be removed by settling, filtering, or other suitable procedure. It is desirable to clarify the reaction products and this may be effected with a clay such as bentonite. Following clarification, the reaction mixture may be subjected to fractionation, steam distillation, gas stripping, or other suitable procedure to remove solvent and diluent and any light hydrocarbon reaction products from the desired product. Where the polymer products are to be employed as blending agents or otherwise employed in admixture with a hydrocarbon oil, a suitable hydrocarbon oil may be admixed with the reaction mixture prior to removal of solvent, diluent, and any light hydrocarbon reaction products, in order to facilitate handling of an otherwise highly viscous or semisolid product.

Any catalyst tar formed during either the first or second stages of the reaction may be removed from the polymerization reaction mixture by settling, filtering, or other suitable procedure, preferably prior to treatment for inactivation of the catalyst. However, the present process is additionally advantageous in that tar formation is at a minimum or is non-existent. Accordingly, economies are effected with respect to catalyst consumption, and treatment for removal of tar and recovery of catalyst therefrom may be avoided.

The process of the invention is applicable to the polymerization of any monoalkylethylene. The monoalkylethylenes are defined, for the purpose of this invention, as olefins having the general formula $R-CH=CH_2$ where R represents an alkyl group. The alkyl group may be straight or branched chain and may contain from one to thirty carbon atoms. Included among these olefins are propylene, 1-butene, 1-pentene, 1-hexene, 1-heptene, 1-octene, 1-decene, and others.

While the process may be applied to the polymerization of any monoalkylethylene, the process is of particular advantage as applied to the polymerization of propylene and the polymerization of 1-butene.

The present process produces propylene polymer products of very high viscosity as compared to propylene polymers heretofore obtained, and these products of high viscosity are particularly useful as blending agents for admixture with base stock lubricating oils to produce blended oils having suitable viscosities and, of more importance, high viscosity indices. Blending agents have been commonly employed to improve the viscosity index of the base stock oil and while satisfactory improvement has been obtained by the use of these agents, the blended oils have been susceptible to loss in viscosity index with use. This loss in viscosity index has been attributed to the high molecular weight of the blending agent. It has been postulated that the molecules of the high molecular weight blending agent are sufficiently large to be readily broken by shearing stresses encountered in use, with consequent loss of the effect of the agent on the viscosity index of the blended oil. The high viscosity and viscosity index propylene polymers of the invention, on the other hand, have comparatively low molecular weights and consequently have molecules of smaller size, as compared with blending agents commonly employed heretofore. They are therefore less affected by shearing stresses encountered in use and their effect on the viscosity and viscosity index of the blended oil is not as readily lost.

In characterizing polymer products of high viscosity, I have found it useful to employ the concept of thickening power and relative thickening power since, at high viscosities, the concepts of viscosity and viscosity index are no longer satisfactory due to the difficulty or impossibility of directly measuring viscosities. By thickening power, I mean the relationship expressed by the equation:

$$TP = \frac{100}{\text{per cent polymer in blend}} \log_{10} \frac{\text{kinematic viscosity of oil blend}}{\text{kinematic viscosity of base oil}}$$

where:

"TP" is the thickening power
"Percent polymer in blend" is the percent by weight of the polymer blended with a base stock lubricating oil;
"Kinematic viscosity of oil blend" is the viscosity in centistokes of the blend of base stock lubricating oil and polymer; and
"Kinematic viscosity of base oil" is the viscosity in centistokes of the base stock lubricating oil.

By $TP_{210}$ and $TP_{100}$, I mean the thickening power, as defined above, where the viscosities of the blends and the base stock lubricating oils are measured at 210° F. and 100° F., respectively. By relative thickening power, I mean the ratio of the thickening powers measured at 210° F. and 100° F., expressed as follows:

$$RTP = \frac{TP_{210}}{TP_{100}}$$

where "RTP" is relative thickening power.

The thickening power is closely related to intrinsic viscosity and is a measure of the molecular weight and viscosity of the polymer. Relative thickening power is closely related to viscosity index and is a measure of the change in viscosity with change in temperature. It will be realized that those polymers having larger values of relative thickening powers will be superior with respect to change in viscosity with temperature.

While, for any given reaction conditions, polymer products of superior thickening power are obtained by the process of the invention, propylene polymers of very high and novel thickening power are obtained by employing the reaction conditions disclosed in the copending applications, Serial Nos. 783,320 and 783,442, filed October 31, 1947, now U. S. Patent No. 2,525,787 and abandoned, respectively.

As disclosed in the copending applications, propylene polymers of high viscosity are obtained by contacting propylene in the presence of a catalyst promoting agent with aluminum bromide dissolved in a nonpolymerizing hydrocarbon solvent and correlating reaction conditions with respect to the ratio of the amount of catalyst promoting agent to the amount of dissolved aluminum bromide and the ratio of the amount of propylene monomer to the amount of dissolved aluminum bromide in the reaction mixture during the course of the reaction. Since the rate at which the propylene polymerizes is not readily ascertainable, it becomes impracticable to set out the ratio of olefin monomer in the reaction mixture to dissolved aluminum bromide, and it is therefore preferred to express this ratio as the rate at which the propylene monomer is added to the dissolved aluminum bromide. The desired propylene polymer products are obtained by employing a mole ratio of promoter, measured as hydrogen bromide, to dissolved aluminum bromide of between about 0.2 and 5, and preferably between about 0.5 and 2.5, and a rate of addition of propylene to dissolved aluminum bromide not greater than 2, and preferably not greater than 1 mole of propylene per mole of dissolved aluminum bromide per minute. For the second step, the propylene is added to the reaction mixture at a rate not greater than 2, and preferably not greater than 1, moles of propylene per mole of dissolved aluminum bromide in the reaction mixture per minute. Temperatures of polymerization may be between about −80° C. and 0° C. Propylene polymer products of higher viscosity are obtained at temperatures between −60° C. and −30° C., with highest viscosity products being obtained at temperatures of about −50° C. The catalyst promoting agents to be employed are those previously mentioned.

By the present process, employing the reaction conditions above, propylene polymer products having 210° F. viscosities in excess of 6,300 Saybolt Universal seconds are obtained, for example 10,000, 13,000 or 15,000 Saybolt Universal seconds, or higher viscosities which cannot be measured directly. In terms of thickening power, propylene polymer products having a thickening power at 210° F. of 2.6 and above, for example, up to 7.0, may be obtained by the process of the invention employing the reaction conditions above. These propylene polymer products are additionally characterized in that the relative thickening power will be greater than the value given by the expression:

$$0.57 + 0.0983(TP_{210}) - 0.00832(TP_{210})^2$$

Novel polymers of 1-butene are also obtained by the process of the invention where the particular reaction conditions are those set forth in the copending application, Serial No. 43,724, filed August 11, 1948, now U. S. Patent No. 2,252,788. As disclosed in the copending application, polymers of 1-butene having high thickening powers may be obtained by contacting 1-butene in the presence of a catalyst promoting agent with aluminum bromide catalyst dissolved in a nonpolymerizing hydrocarbon and correlating the ratio of catalyst promoter to dissolved aluminum bromide and the rate of addition of 1-butene to the dissolved aluminum bromide. The ratio of catalyst promoter to dissolved aluminum bromide should be between 0.05 and 1.6, and preferably between about 0.08 and 1.2, moles of promoter per mole of aluminum bromide and the rate of addition of 1-butene should be not greater than 4, and preferably not greater than 2.5, moles per mole of dissolved aluminum bromide per minute. For the second step, the 1-butene is added to the reaction mixture at a rate not greater than 4, and preferably not greater than 2.5, moles per mole of dissolved aluminum bromide in the reaction mixture per minute. The catalyst promoting agents to be employed are those previously mentioned. The amount of 1-butene added to the catalyst may be between 5 and 90 moles per mole of dissolved aluminum bromide and the temperature should be between −10° C. and −45° C., and preferably between −25° C. and −40° C. By employing these reaction conditions in the second step of the process of the present invention, 1-butene polymers having thickening powers at 210° F. between 25 and 35 may be obtained.

The above described polymers of propylene and 1-butene are characterized by having thickening powers at 210° F. whose values are related to the number of carbon atoms in the monomer. If the thickening power at 210° F. is added to the number of carbon atoms in the monomer greater than the number of carbon atoms in propylene monomer and this sum is divided by 10 raised to a power equal to the number of carbon atoms in the monomer greater than the number of carbon atoms in propylene monomer, the quotient will have a value of at least 2.6.

Thickening power and relative thickening power will vary somewhat with different base oils. Accordingly, in comparing thickening power and relative thickening power, the comparison should be made where the base oils are somewhat comparable in viscosity and viscosity index. Hereinabove and hereinafter, whenever thickening power and relative thickening power are specified, it is to be understood that the base oil will have a kinematic viscosity between 4.5 and 5.5 centistokes at 210° F. and a viscosity index between 80 and 120. Further, at higher concentrations of polymer in the blend, the thickening power and relative thickening power will vary somewhat. For this reason, thickening powers and relative thickening powers should be compared and are set forth hereinabove and hereinafter only when the amount of polymer blended with the base oil is less than sufficient to produce a blend having a viscosity triple that of the base oil.

The accompanying drawing is a flow sheet schematically illustrating one method of carrying out the polymerization reaction.

Referring now to the flow sheet, a saturated hydrocarbon diluent enters polymerization reactor 10 through line 11 provided with valve 12. After a suitable amount of diluent has entered the reactor, streams of olefin, promoter, and aluminum bromide solution are passed simultaneously to the reactor through lines 14, 15, and 16, respectively. Preferably, the aluminum bromide is dissolved in the same saturated hydrocarbon as is employed as the diluent. Line 14 is provided with valve 17, line 15 is provided with valve 19, and line 16 is provided with valve 20 in order that the flow of olefin, promoter, and aluminum bromide solution entering the reactor may be controlled at the desired rates. Preferably, the feed streams are brought to the desired reaction temperature prior to entering the reactor, and this may be accomplished by means of heat exchangers 21, 22, 24, and 25 in lines 11, 14, 15, and 16, respectively. Mixing of diluent, olefin, promoter, and aluminum bromide solution is obtained by means of stirrer 26 and control of the temperature of the mixture is obtained by passage of a suitable refrigerant through reactor jacket 27. During passage of olefin, promoter, and aluminum bromide solution to the reactor, flow of diluent may be continued or may be discontinued, as desired.

Polymerization reactor 10 may be employed to carry out the first and second steps of the polymerization reaction or may be employed to carry out only the first step of the polymerization reaction. Where the reactor is employed to carry out the first and second steps of the reaction, flow of olefin, promoter, and aluminum bromide solution may be continued until the reactor contains the desired amount of polymerization reaction mixture. The flow of aluminum bromide solution may then be discontinued and the flow of olefin continued at the desired rate to carry out the second step of the polymerization reaction. The flow of promoter may be discontinued after the initial step or may be continued either intermittently or at a steady rate during the second step of the reaction, as desired. Following completion of the second step, the resulting reaction mixture may be removed from the reactor through line 29 and passed to settler 30.

Where polymerization reactor 10 is employed to carry out only the first step of the polymerization reaction, the polymerization reaction mixture, following the completion of the first step, may be removed from the reactor through line 29 and passed through line 31, connected to line 29, to storage vessel 32 and stored under refrigeration until desired for use. When desired for use, the mixture is removed from the storage vessel through line 34 containing heat exchanger 35, and passed to either or both of polymerization reactors 36 and 37 through lines 39 or 40 connected to line 29 for the second step of the polymerization reaction. Alternatively, the polymerization reaction mixture removed from reactor 10 through line 29 may be immediately transferred to either or both of polymerization reactors 36 and 37. When polymerization reactor 36 contains the desired amount of polymerization reaction mixture the flow thereto is discontinued, and olefin is added to the mixture, entering the reactor through line 41, the rate of flow being controlled by valve 42 and the temperature by heat exchanger 44. Similarly, when polymerization reactor 37 contains the desired amount of polymerization reaction mixture, the flow thereto is discontinued, and olefin is added to the mixture through line 45, the rate of flow being controlled by valve 46, and the temperature by heat exchanger 47. Polymerization reactors 36 and 37 are provided with stirrers 49 and 50, respectively, for agitation of the reaction mixtures and with jackets 51 and 52 respectively, for passage of a suitable refrigerant for control of the reaction temperature. Promoter may be added continuously or intermittently during the reaction to reactors 36 and 37 from lines 54 and 55, respectively, connected to line 56 containing heat exchanger 57. Two polymerization reactors 36 and 37 are shown. However, any desired number of reactors may be employed for the second step of the polymerization reaction to insure continuous operation by maintaining constant flow of reaction mixture from reactor 10.

Following completion of the second step of the polymerization reaction in reactors 36 and 37, the resulting reaction mixtures may be removed through lines 59 and 60, respectively, and passed to settler 30. In settler 30, any catalyst tar which may have been formed is permitted to settle from the reaction mixture and is removed through line 61. The remainder of the reaction mixture leaves the settler through line 62 and is passed to quenching vessel 64 where it is admixed by means of stirrer 65 with a solution of alcohol and water entering through line 66 to deactivate the aluminum bromide and promoter. The resulting mixture leaves the quenching vessel through line 67 and is passed to settler 69 where the heavier alcohol and water phase settles to the bottom and is removed through line 70. The hydrocarbon phase leaves the settler through line 71 and is passed through clay chambers 72 and 74 for clarification. Chambers 72 and 74 are connected in parallel and provided with suitable valves in order that continuous operation may be obtained by leaving one chamber on stream while the other chamber is taken off stream for refilling or regeneration of the clay. Steam or other medium for regeneration of the clay may enter through line 75 and leave chambers 72 and 74 through lines 76 and 77, respectively.

The clarified products from the clay chambers pass through line 79 to fractionation column 80. Where the polymer products are to be employed subsequently in admixture with a hydrocarbon oil, a suitable, light hydrocarbon oil may be added from line 81 connected to line 79. The saturated hydrocarbon employed as diluent and as solvent for the catalyst is removed as overhead from fractionation column 80 through line 82, condensed in condenser 84, and passed to receiver 85, from where it may be recycled to reactor 10 through line 86. The bottoms from fractionation column 80 comprise the desired polymer product and any light polymer products that may have formed during the reaction. The bottoms are transferred through line 87 to fractionation column 89 where the light polymer products are removed as overhead through line 90 and condensed in condenser 91 to be utilized as desired. The desired polymer product is removed from column 89 through line 92.

The above-described procedure is susceptible of various modifications. For example, in place of employing the clay chambers 72 and 74, the polymerization reaction products in line 71 may be clarified by admixing with clay and thereafter filtering the clay therefrom. Additionally, the polymer products issuing as bottoms from the fractionation column 80 may be steam distilled, gas flushed, or otherwise treated for removal of any light polymer products. These and other modifications may be readily made by those skilled in the art.

The examples following will be illustrative of the invention. In each example where propylene or 1-butene was polymerized, the reaction conditions were those disclosed in the aforementioned copending applications.

EXAMPLES 1 TO 3

In these examples, normal butane diluent in the liquid phase was passed into a polymerization reactor provided with an internal cooling coil and a motor operated stirrer until the reactor was approximately one-third full. A liquid stream of propylene, a stream of aluminum bromide catalyst dissolved in liquid normal butane, and a stream of hydrogen bromide promoter, all pre-cooled to approximately the temperature maintained within the reactor, were passed simultaneously to the reactor at a constant rate with vigorous stirring for the first step of the reaction. The time during which the three streams were passed to the reactor is indicated in the table. Subsequently, the streams of aluminum bromide catalyst solution and hydrogen bromide promoter were discontinued and the stream of propylene continued for the second step of the reaction. Intermittently, hydrogen bromide, or, in Example 1, a mixture of hydrogen bromide and isopropyl bromide, was added to the reactor, as additional promoter at the same rate as in the first step. Following completion of the second step, the reaction mixture was admixed with isopropyl alcohol and water to deactivate the catalyst. The alcohol-water phase was separated by settling from the hydrocarbon phase, and the desired propylene polymer product was recovered from the hydrocarbon phase by distillation to remove any light polymer products. The desired polymer product, similarly as in all the other examples hereinafter, was obtained in a yield of at least 98% by weight of the propylene passed to the reactor.

The thickening powers of the polymer products were determined by blending in an amount of 2% by weight with a neutral lubricating oil having a 210° F. viscosity of 5.08 centistokes and a 100° F. viscosity of 29.1 centistokes (viscosity index=113), measuring the viscosities of the blends at 100° F. and at 210° F., and substituting the measured viscosities in the formulas for thickening power given hereinabove.

Table I lists the reaction conditions for the first step and the second step of the reaction, the thickening powers at 100° F. and 210° F., and the relative thickening powers of the polymer products.

Table I

| Example No. | 1 | 2 | 3 |
|---|---|---|---|
| *First Step* | | | |
| Temperature, °C | −30 | −30 | −40 |
| Time, Minutes | 8.5 | 10 | 9 |
| Mole Ratio of Propylene to Aluminum Bromide | 3.5 | 4.0 | 3.0 |
| Mole Ratio of Hydrogen Bromide to Aluminum Bromide | 0.3 | 0.3 | 0.3 |
| *Second Step* | | | |
| Temperature, °C | −30 | −30 | −40 |
| Mole Ratio of n-Butane to Propylene [1] | 4.0 | 8.3 | 5.0 |
| Mole Ratio of Propylene to Aluminum Bromide [2] | 50 | 24 | 40 |
| Mole Ratio of Promoter to Aluminum Bromide [3] | 1.0 | 1.0 | 1.0 |
| Propylene Feed Rate, Moles of Propylene per Mole of Aluminum Bromide per Minute | 0.40 | 0.40 | 0.33 |
| *Product* | | | |
| Viscosity of Blend at 100° F., Centistokes | 34.4 | 35.0 | 35.4 |
| Viscosity of Blend at 210° F., Centistokes | 5.82 | 5.92 | 6.02 |
| Viscosity Index of Blend | 122 | 122 | 125 |
| Thickening Power at 100° F | 3.68 | 3.99 | 4.22 |
| Thickening Power at 210° F | 2.94 | 3.35 | 3.63 |
| Relative Thickening Power | 0.80 | 0.84 | 0.86 |

[1] Includes the n-butane and propylene added to the reactor in the first step.
[2] Includes the propylene added to the reactor in the first step.
[3] Includes the promoter added to the reactor in the first step.

EXAMPLES 4 TO 9

In these examples, precooled liquid streams of diluent, dissolved aluminum bromide catalyst, propylene alone or admixed with a diluent, and hydrogen bromide promoter were passed continuously, to a polymerization reactor provided with an internal cooling coil and a motor driven stirrer for the first step of the reaction. In Examples 6, 7, and 9, the diluent and solvent was propane. In the other examples, the diluent and solvent was n-butane but no diluent was admixed with the propylene prior to entering the reactor. The polymerization reaction mixture produced was continuously withdrawn from the reactor and discarded until steady state conditions were established, i. e., until about four reactor volumes were discarded. The polymerization reaction mixture issuing from the reactor after steady state conditions were established was then passed immediately to a second polymerization reactor, also provided with an internal cooling coil and a motor driven stirrer. To the mixture in the second polymerization reactor, propylene alone, or, as in Examples 6, 7, and 9, admixed with propane, was then added at a constant rate, for the second step of the reaction. Hydrogen bromide promoter was not added to the reaction mixture in the second step. Following completion of the second step, the polymerization reaction mixture in the second polymerization reactor was removed and treated similarly as described in the previous examples for inactivation of catalyst, recovery of polymer product, and determination of the thickening powers of the polymer products.

Table II lists the reaction conditions for the first and second steps and the thickening powers of the polymer products.

Table II

| Example No. | 4 | 5 | 6 | 7 | 8 | 9 |
|---|---|---|---|---|---|---|
| *First Step* | | | | | | |
| Temperature, °C | −30 | −30 | −44 | −44 | −50 | −44 |
| Residence Time, Minutes | 10 | 30 | 60 | 60 | 30 | 60 |
| Mole Ratio of Propylene to Aluminum Bromide | 4.0 | 10 | 20 | 20 | 10 | 20 |
| Mole Ratio of Hydrogen Bromide to Aluminum Bromide | 1.0 | 0.5 | 0.5 | 0.5 | 0.5 | 0.75 |
| Mole Ratio of n-Butane or Propane to Propylene | 25 | 20 | 11 | 11 | 20 | 11 |
| *Second Step* | | | | | | |
| Temperature, °C | −30 | −30 | −44 | −45 | −50 | −44 |
| Mole Ratio of n-Butane or Propane to Propylene [1] | 4.0 | 2.8 | 3.5 | 2.7 | 2.8 | 2.7 |
| Mole Ratio of Propylene to Aluminum Bromide [2] | 48 | 74 | 80 | 120 | 73 | 120 |
| Mole Ratio of Hydrogen Bromide to Aluminum Bromide | 1.0 | 0.5 | 0.5 | 0.5 | 0.5 | 0.75 |
| Propylene Feed Rate, Moles of Propylene for Mole of Aluminum Bromide per Minute | 0.40 | 0.35 | 0.33 | 0.33 | 0.35 | 0.33 |
| *Product* | | | | | | |
| Viscosity of Blend at 100° F., Centistokes | 33.6 | 34.2 | 39.0 | 39.6 | 40.6 | 34.5 |
| Viscosity of Blend at 210° F., Centistokes | 5.74 | 5.86 | 6.66 | 6.75 | 6.84 | 6.28 |
| Viscosity Index of Blend | 122 | 124 | 131 | 132 | 131 | 137 |
| Thickening Power at 100° F | 3.13 | 3.54 | 6.35 | 6.68 | 7.26 | 7.78 |
| Thickening Power at 210° F | 2.60 | 3.05 | 5.74 | 6.15 | 6.46 | 7.08 |
| Relative Thickening Power | 0.83 | 0.84 | 0.90 | 0.92 | 0.89 | 0.91 |

[1] Includes the n-butane or propane and the propylene in the mixture from the first polymerization reactor.
[2] Includes the propylene contained in the mixture from the first polymerization reactor.

EXAMPLE 10

This example was carried out in the same manner as Examples 1 to 3, except that the polymerization reaction mixture, after the first step, and before beginning the second step, was stored for a period of four hours at a temperature of −40° C. Table III lists the reaction conditions for the first and second steps and the thickening powers of the polymer products.

Table III

First step:
  Temperature—° C. _____ −40
  Time—minutes _____ 15
  Mole ratio of propylene to aluminum
    bromide _____ 10
  Mole ratio of hydrogen bromide to
    aluminum bromide _____ 0.5
  Mole ratio of n-butane to propylene____ 20

Second step:
- Temperature—° C. _____ −40
- Mole ratio of n-butane to propylene [1]__ 2.0
- Mole ratio of propylene to aluminum bromide [2] _____ 67.5
- Mole ratio of hydrogen bromide to aluminum bromide [3] _____ 1.0
- Propylene feed rate—moles of propylene per mole of aluminum bromide per minute _____ 0.67

Product:
- Viscosity of blend at 100° F.—centistokes _____ 34.4
- Viscosity of blend at 210° F.—centistokes _____ 5.90
- Viscosity index of blend_____ 125
- Thickening power at 100° F. _____ 3.87
- Thickening power at 210° F. _____ 3.25
- Relative thickening power _____ 0.84

[1] Includes the n-butane and propylene added to the reactor in the first step.
[2] Includes the propylene added to the reactor in the first step.
[3] Includes the hydrogen bromide added to the reactor in the first step.

EXAMPLE 11

This example was carried out in the same manner as Examples 4 to 9 except that the polymerization reaction mixture continuously removed from the first polymerization reactor was stored for 16 hours at a temperature of −78° C. before beginning the second step of the polymerization reaction. Normal butane was the solvent and diluent employed.

Table IV lists the reaction conditions for the first and second step and the thickening powers of the product.

Table IV

First step:
- Temperature—° C. _____ −40
- Residence time—minutes _____ 60
- Mole ratio of propylene to aluminum bromide _____ 20
- Mole ratio of hydrogen bromide to aluminum bromide _____ 0.5
- Mole ratio of n-butane to propylene__ 10

Second step:
- Temperature—° C. _____ −40
- Mole ratio of n-butane to propylene [1] __ 2.2
- Mole ratio of propylene to aluminum bromide [2] _____ 93
- Mole ratio of hydrogen bromide to aluminum bromide _____ 0.5
- Propylene feed rate—moles of propylene per mole of aluminum bromide per minute _____ 0.39

Product:
- Viscosity of blend at 100° F.—centistokes _____ 37.8
- Viscosity of blend at 210 F.—centistokes _____ 6.40
- Viscosity index of blend _____ 128
- Thickening power at 100° F. _____ 5.70
- Thickening power at 210° F. _____ 5.12
- Relative thickening power _____ 0.90

[1] Includes the n-butane and propylene added to the reactor in the first step.
[2] Includes the propylene added to the reactor in the first step.

EXAMPLE 12

This example will serve to compare the process of the invention with a single step polymerization process. In this example, propylene polymer product was prepared in a single step by adding propylene at a controlled, uniform rate with constant stirring to a solution of aluminum bromide catalyst in normal butane containing hydrogen bromide promoter. The reaction conditions were those disclosed in the aforementioned copending applications, Serial Nos. 783,320 and 783,442. Following completion of addition of propylene to the solution of aluminum bromide, the reaction mixture was admixed with alcohol and water to deactivate the catalyst. Thereafter, the reaction mixture was treated similarly as in the previous examples. The reaction conditions and the thickening powers of the polymer product are given in Table V.

Table V

- Temperature—°C. _____ −40
- Time—minutes _____ 240
- Mole ratio of propylene to aluminum bromide _____ 33.4
- Mole ratio of hydrogen bromide to aluminum bromide_____ 1.25
- Mole ratio of n-butane to propylene_____ 2.39
- Propylene feed rate—moles of propylene per mole of aluminum bromide per minute _____ 0.14
- Viscosity of blend at 100° F.—centistokes___ 33.2
- Viscosity of blend at 210° F.—centistokes___ 5.57
- Viscosity index of blend_____ 122
- Thickening power at 100° F_____ 2.86
- Thickening power at 210° F_____ 2.0
- Relative thickening power_____ 0.7

It will be noted that the polymer product produced by the single step polymerization process had a thickening power at 210° F. of only 2.0 whereas the lowest thickening power at 210° F. of any of the polymer products of the preceding examples was 2.6, an increase of 30%.

EXAMPLE 13

In this example, 1-butene was polymerized in accordance with the invention in the same manner as described in connection with the polymerization of propylene in Examples 1 to 3 above. The reaction conditions employed, however, were those disclosed in the aforementioned copending application, Serial No. 43,724. Table VI lists the reaction conditions for the first and second steps and the thickening powers of the polymer product.

Table VI

First step:
- Temperature—°C. _____ −30
- Time—minutes _____ 10
- Mole ratio of 1-butene to aluminum bromide _____ 4.1
- Mole ratio of hydrogen bromide to aluminum bromide_____ 0.27
- Mole ratio of n-butane to 1-butene___ 48

Second Step:
- Temperature—°C. _____ −30
- Mole ratio of n-butane to 1-butene [1]__ 5.6
- Mole ratio of 1-butene to aluminum bromide [2] _____ 35
- Mole ratio of hydrogen bromide to aluminum [3] _____ 0.40
- 1-butene feed rate—moles of 1-butene per mole of aluminum bromide per minute _____ 0.412

Product:
- Viscosity of blend at 100° F.—centistokes _____ 143.0
- Viscosity of blend at 210° F.—centistokes _____ 25.4
- Viscosity index of blend_____ 146
- Thickening power at 100° F._____ 34.6

Thickening power at 210° F_____ 35.0
Relative thickening power_____ 1.01

¹ Includes the n-butane and 1-butene added to the reactor in the first step.
² Includes the 1-butene added to the reactor in the first step.
³ Includes the hydrogen bromide added to the reactor in the first step.

EXAMPLE 14

This example will serve to compare the results obtained in the previous example, where the process of the invention was employed, with the results obtained where a single step polymerization process is employed. In this example, 1-butene was polymerized in the same manner as described for propylene in Example 12. The reaction conditions were those disclosed in the aforementioned copending application Serial No. 43,724. Table VII lists the reaction conditions and the thickening powers of the polymer product.

Table VII

| | |
|---|---|
| Temperature—° C | −30 |
| Time—minutes | 60 |
| Mole ratio of 1-butene to aluminum bromide | 50 |
| Mole ratio of hydrogen bromide to aluminum bromide | 1.36 |
| Mole ratio of n-butane to 1-butene | 8.3 |
| 1-butene feed rate—moles of 1-butene per mole of aluminum bromide per minute | 0.834 |
| Viscosity of blend at 100° F.—centistokes | 55.9 |
| Viscosity of blend at 210° F.—centistokes | 9.73 |
| Viscosity index of blend | 143 |
| Thickening power at 100° F | 14.2 |
| Thickening power at 210° F | 14.1 |
| Relative thickening power | 0.99 |

It will be observed that the 1-butene polymer product obtained by the single step process had a thickening power at 210° F. of only 14.1, whereas the 1-butene polymer of the previous example obtained by the process of the invention had a thickening power at 210° F. of 35.0.

EXAMPLE 15

This example will illustrate the results obtained by the process of the invention where a different monoalkylethylene is used in the second step than in the first step. In this example, for the first step of the reaction, a stream of 1-butene was passed to a polymerization reactor containing normal butane solvent simultaneously with a stream of aluminum bromide catalyst dissolved in n-butane and a stream of hydrogen bromide promoter, in the same manner as described for propylene in Examples 1 to 3. The streams were discontinued and a stream of propylene was passed to the reactor at a uniform rate for the second step of the reaction. Hydrogen bromide was added intermittently during the second step of the reaction. Following completion of the second step, the reaction mixture was treated in the same manner as described in Examples 1 to 3. Table VIII lists the reaction conditions for the first and second steps and the thickening powers of the polymer product.

Table VIII

First step:

| | |
|---|---|
| Temperature—° C | −30 |
| Time—minutes | 5 |
| Mole ratio of 1-butene to aluminum bromide | 12.1 |
| Mole ratio of hydrogen bromide to aluminum bromide | 0.20 |
| Mole ratio of n-butane to 1-butene | 33 |

Second step:

| | |
|---|---|
| Temperature—° C | −30 |
| Mole ratio of n-butane to monoalkylethylene ¹ | 5.6 |
| Mole ratio of monoalkylethylene to aluminum bromide ² | 71.7 |
| Mole ratio of hydrogen bromide to aluminum bromide ³ | 0.40 |
| Propylene feed rate—moles of propylene per mole of aluminum bromide per minute | 0.29 |

Product:

| | |
|---|---|
| Viscosity of blend at 100° F.—centistokes | 34.9 |
| Viscosity of blend at 210° F.—centistokes | 5.92 |
| Viscosity index of blend | 123 |
| Thickening power at 100° F | 3.98 |
| Thickening power at 210° F | 3.34 |
| Relative thickening power | 0.84 |

¹ Includes the n-butane and 1-butene added to the reactor in the first step.
² Includes the 1-butene added to the reactor in the first step.
³ Includes the hydrogen bromide added to the reactor in the first step.

EXAMPLE 16

This example will serve to illustrate the ability of propylene polymers prepared by the process of the invention to withstand shearing stresses similar to those encountered in the use of blended oils. In this example, propylene polymer was admixed with a base lubricating oil and the blend subjected to shearing stresses by being forced repeatedly at constant rate through orifices having a diameter of 0.006 inch. Viscosity of the oil was determined before and after each passage through the orifices. Table IX lists the test conditions and results obtained. For purposes of comparison, the table lists the conditions and results of two other tests where a comparable base oil was blended with commercial viscosity index improving agents.

Table IX

| Agent | Propylene Polymer | Agent A | Agent B |
|---|---|---|---|
| Viscosity of Base Oil at 210° F., Centistokes | 5.05 | 5.28 | 5.10 |
| Viscosity Index of Base Oil | 113.6 | 116.0 | 114.0 |
| Weight Per Cent of Agent in Blend | 2.28 | 0.55 | 0.50 |
| Viscosity of Blend at 210° F., Centistokes: | | | |
| Initially | 6.08 | 6.16 | 6.21 |
| After 1 Pass | 6.06 | 5.66 | 5.45 |
| After 5 Passes | 6.02 | 5.54 | 5.34 |
| After 10 Passes | 6.00 | 5.44 | 5.34 |
| Viscosity Index of Blend: | | | |
| Initially | 123.5 | 131.2 | 131.0 |
| After 1 Pass | 123.4 | 121.6 | 120.0 |
| After 5 Passes | 122.5 | 121.0 | 118.0 |
| After 10 Passes | 121.4 | 116.0 | 118.0 |

It will be observed from the above table that whereas the commercial types of viscosity index improving agents produced increases in viscosity comparable to those produced by the propylene polymer and increases in viscosity index comparatively larger than those produced by the propylene polymer, the decreases in viscosity and viscosity index after 1, 5, and 10 passes in the case of the propylene polymer were small as compared with the decreases in the case of the two commercial agents.

Having thus described my invention, it will be understood that such description has been given by way of illustration and example only and not by way of limitation, reference being had for the latter purpose to the appended claims.

I claim:

1. The process for effecting the polymerization of monoalkylethylenes, which comprises simultaneously passing a monoalkylethylene, a solution of aluminum bromide catalyst in a solvent having no deleterious effect on the polymerization reaction, and a promoter for said aluminum bromide catalyst into a polymerization reaction zone to form a polymerization reaction mixture, at rates such that, during the course of the polymerization reaction in said polymerization reaction zone, the mol ratio of promoter to dissolved aluminum bromide catalyst will fall within the range varying between about 0.2 and about 5, when the monoalkylethylene is propylene, and between about 0.05 and about 1.6, when the monoalkylethylene contains more than three carbon atoms per molecule, and the rate of passage of the monoalkylethylene into said polymerization reaction zone will be not greater than about 2 mols per mol of dissolved aluminum bromide catalyst per minute, when the monoalkylethylene is propylene, and not greater than about 4 mols per mol of dissolved aluminum bromide catalyst per minute, when the monoalkylethylene contains more than three carbon atoms per molecule; maintaining said polymerization reaction zone at a temperature falling within the range varying between about $-80°$ C. and about $0°$ C., when the monoalkylethylene is propylene, and between about $-45°$ C. and about $-10°$ C., when the monoalkylethylene contains more than three carbon atoms per molecule; discontinuing the passage of said solution of aluminum bromide catalyst and of said promoter into said polymerization reaction mixture; passing additional amounts of said monoalkylethylene into said polymerization reaction mixture at a rate not greater than about 2 mols per minute per mol of aluminum bromide catalyst present in said polymerization reaction mixture, when the monoalkylethylene is propylene, and not greater than about 4 mols per minute per mol of aluminum bromide catalyst present in said polymerization reaction mixture, when the monoalkylethylene contains more than three carbon atoms per molecule; and maintaining said polymerization reaction mixture at a temperature falling within the range varying between about $-80°$ C. and about $0°$ C., when the monoalkylethylene is propylene, and between about $-45°$ C. and about $-10°$ C., when the monoalkylethylene contains more than three carbon atoms per molecule.

2. The process for effecting the polymerization of propylene, which comprises simultaneously passing propylene, a solution of aluminum bromide catalyst in a solvent having no deleterious effect on the polymerization reaction, and a promoter for said aluminum bromide catalyst into a polymerization reaction zone to form a polymerization reaction mixture, at rates such that, during the course of the polymerization reaction in said polymerization reaction zone, the mol ratio of promoter to dissolved aluminum bromide catalyst will fall within the range varying between about 0.5 and about 2.5, and the rate of passage of the propylene into said polymerization reaction zone will be not greater than about 1 mol per mol of dissolved aluminum bromide catalyst per minute; maintaining said polymerization reaction zone at a temperature falling within the range varying between about $-60°$ C. and about $-30°$ C.; discontinuing the passage of said solution of aluminum bromide catalyst and of said promoter into said polymerization reaction mixture; passing additional amounts of said propylene into said polymerization reaction mixture at a rate not greater than about 1 mol per minute per mol of aluminum bromide catalyst present in said polymerization reaction mixture; and maintaining said polymerization reaction mixture at a temperature falling within the range varying between about $-60°$ C. and about $-30°$ C.

3. The process for effecting the polymerization of butene-1, which comprises simultaneously passing butene-1, a solution of aluminum bromide catalyst in a solvent having no deleterious effect on the polymerization reaction, and a promoter for said aluminum bromide catalyst into a polymerization reaction zone to form a polymerization reaction mixture, at rates such that, during the course of the polymerization reaction in said polymerization reaction zone, the mol ratio of promoter to dissolved aluminum bromide catalyst will fall within the range varying between about 0.05 and about 5, and the rate of passage of the butene-1 into said polymerization reaction zone will be not greater than about 4 mols per mol of dissolved aluminum bromide catalyst per minute; maintaining said polymerization reaction zone at a temperature falling within the range varying between about $-45°$ C. and about $-10°$ C.; discontinuing the passage of said solution of aluminum bromide catalyst and of said promoter into said polymerization reaction mixture; passing additional amounts of said butene-1 into said polymerization reaction mixture at a rate not greater than about 4 mols per minute per mol of aluminum bromide catalyst present in said polymerization reaction mixture; and maintaining said polymerization reaction mixture at a temperature falling within the range varying between about $-45°$ C. and about $-10°$ C.

4. The process for effecting the polymerization of butene-1, which comprises simultaneously passing butene-1, a solution of aluminum bromide catalyst in a solvent having no deleterious effect on the polymerization reaction, and a promoter for said aluminum bromide catalyst into a polymerization reaction zone to form a polymerization reaction mixture, at rates such that, during the course of the polymerization reaction in said polymerization reaction zone, the mol ratio of promoter to dissolved aluminum bromide catalyst will fall within the range varying between about 0.08 and about 1.2, and the rate of passage of the butene-1 into said polymerization reaction zone will be not greater than about 2.5 mols per mol of dissolved aluminum bromide catalyst per minute; maintaining said polymerization reaction zone at a temperature falling within the range varying between about $-40°$ C. and about $-25°$ C.; discontinuing the passage of said solution of aluminum bromide catalyst and of said promoter into said polymerization reaction mixture; passing additional amounts of said butene-1 into said polymerization reaction mixture at a rate not greater than about 2.5 mols per minute per mol of aluminum bromide catalyst present in said polymerization reaction mixture; and maintaining said polymerization reaction mixture at a temperature falling within the range varying between about $-40°$ C. and about $-25°$ C.

5. The process for effecting the polymerization of monoalkylethylenes, which comprises simultaneously passing a monoalkylethylene, a solution of aluminum bromide catalyst in a solvent having no deleterious effect on the polymerization reaction, and a promoter for said aluminum bromide catalyst into a first polymerization reaction zone to form a polymerization reaction mixture, at rates such that, during the course of the polymerization reaction in said first polymerization reaction zone, the mol ratio of promoter to dissolved aluminum bromide catalyst will fall within the range varying between about 0.2 and about 5, when the monoalkylethylene is propylene, and between about 0.05 and about 1.6, when the monoalkylethylene contains more than three carbon atoms per molecule, and the rate of passage of the monoalkylethylene into said first polymerization reaction zone will be not greater than about 2 mols per mol of dissolved aluminum bromide catalyst per minute, when the monoalkylethylene is propylene, and not greater than about 4 mols per mol of dissolved aluminum bromide catalyst per minute, when the monoalkylethylene contains more than three carbon atoms per molecule; maintaining said first polymerization reaction zone at a temperature falling within the range varying between about −80° C. and about 0° C., when the monoalkylethylene is propylene, and between about −45° C. and about −10° C., when the monoalkylethylene contains more than three carbon atoms per molecule; discontinuing the passage of said solution of aluminum bromide catalyst and of said promoter into said polymerization reaction mixture; transferring said polymerization reaction mixture from said first polymerization reaction zone to a second polymerization reaction zone; passing additional amounts of said monoalkylethylene into said polymerization reaction mixture at a rate not greater than about 2 mols per minute per mol of aluminum bromide catalyst present in said polymerization reaction mixture, when the monoalkylethylene is propylene, and not greater than about 4 mols per minute per mol of aluminum bromide catalyst present in said polymerization reaction mixture, when the monoalkylethylene contains more than three carbon atoms per molecule; and maintaining said polymerization reaction mixture at a temperature falling within the range varying between about −80° C. and about 0° C., when the monoalkylethylene is propylene, and between about −45° C. and about −10° C., when the monoalkylethylene contains more than three carbon atoms per molecule.

6. The process for effecting the polymerization of monoalkylethylenes, which comprises simultaneously passing a monoalkylethylene, a solution of aluminum bromide catalyst in a solvent having no deleterious effect on the polymerization reaction, and a promoter for said aluminum bromide catalyst into a polymerization reaction zone to form a polymerization reaction mixture, at rates such that, during the course of the polymerization reaction in said polymerization reaction zone, the mol ratio of promoter to dissolved aluminum bromide catalyst will fall within the range varying between about 0.2 and about 5, when the monoalkylethylene is propylene, and between about 0.05 and about 1.6, when the monoalkylethylene contains more than three carbon atoms per molecule, and the rate of passage of the monoalkylethylene into said polymerization reaction zone will be not greater than about 2 mols per mol of dissolved aluminum bromide catalyst per minute, when the monoalkylethylene is propylene, and not greater than about 4 mols per mol of dissolved aluminum bromide catalyst per minute, when the monoalkylethylene contains more than three carbon atoms per molecule; maintaining said polymerization reaction zone at a temperature falling within the range varying between about −80° C. and about 0° C., when the monoalkylethylene is propylene, and between about −45° C. and about −10° C., when the monoalkylethylene contains more than three carbon atoms per molecule; removing said polymerization reaction mixture from said polymerization reaction zone; maintaining said polymerization reaction mixture in storage; subsequently, removing said polymerization reaction mixture from storage; passing additional amounts of said monoalkylethylene into said polymerization reaction mixture at a rate not greater than about 2 mols per minute per mol of aluminum bromide catalyst present in said polymerization reaction mixture, when the monoalkylethylene is propylene, and not greater than about 4 mols per minute per mol of aluminum bromide catalyst present in said polymerization reaction mixture, when the monoalkylethylene contains more than three carbon atoms per molecule; and maintaining said polymerization reaction mixture at a temperature falling within the range varying between about −80° C. and about 0° C., when the monoalkylethylene is propylene, and between about −45° C. and about −10° C., when the monoalkylethylene contains more than three carbon atoms per molecule.

7. The product obtained by the process for effecting the polymerization of monoalkylethylenes, which comprises simultaneously passing a monoalkylethylene, a solution of aluminum bromide catalyst in a solvent having no deleterious effect on the polymerization reaction, and a promoter for said aluminum bromide catalyst into a polymerization reaction zone to form a polymerization reaction mixture, at rates such that, during the course of the polymerization reaction in said polymerization reaction zone, the mol ratio of promoter to dissolved aluminum bromide catalyst will fall within the range varying between about 0.2 and about 5, when the monoalkylethylene is propylene, and between about 0.05 and about 1.6, when the monoalkylethylene contains more than three carbon atoms per molecule, and the rate of passage of the monoalkylethylene into said polymerization reaction zone will be not greater than about 2 mols per mol of dissolved aluminum bromide catalyst per minute, when the monoalkylethylene is propylene, and not greater than about 4 mols per mol of dissolved aluminum bromide catalyst per minute, when the monoalkylethylene contains more than three carbon atoms per molecule; maintaining said polymerization reaction zone at a temperature falling within the range varying between about −80° C. and about 0° C., when the monoalkylethylene is propylene, and between about −45° C. and about −10° C., when the monoalkylethylene contains more than three carbon atoms per molecule; discontinuing the passage of said solution of aluminum bromide catalyst and of said promoter into said polymerization reaction mixture; passing additional amounts of said monoalkylethylene into said polymerization reaction mixture at a rate not greater than about 2 mols per minute per mol of aluminum bromide catalyst present in said polymerization reaction mixture, when the monoalkylethylene is propylene, and not greater than about 4 mols per minute per mol of aluminum bromide catalyst present in said polymerization reaction mixture, when the monoalkylethylene contains more than three carbon atoms per molecule; and maintaining said polymerization reaction mixture at a temperature falling within the range varying between about —80° C. and about 0° C., when the monoalkylethylene is propylene, and between about —45° C. and about —10° C., when the monoalkylethylene contains more than three carbon atoms per molecule.

8. The product obtained by the process for effecting the polymerization of propylene, which comprises simultaneously passing propylene, a solution of aluminum bromide catalyst in a solvent having no deleterious effect on the polymerization reaction, and a promoter for said aluminum bromide catalyst into a polymerization reaction zone to form a polymerization reaction mixture, at rates such that, during the course of the polymerization reaction in said polymerization reaction zone, the mol ratio of promoter to dissolved aluminum bromide catalyst will fall within the range varying between about 0.5 and about 25, and the rate of passage of the propylene into said polymerization reaction zone will be not greater than about 1 mol per mol of dissolved aluminum bromide catalyst per minute; maintaining said polymerization reaction zone at a temperature falling within the range varying between about —60° C. and about —30° C.; discontinuing the passage of said solution of aluminum bromide catalyst and of said promoter into said polymerization reaction mixture; passing additional amounts of said propylene into said polymerization reaction mixture at a rate not greater than about 1 mol per minute per mol of aluminum bromide catalyst present in said polymerization reaction mixture; and maintaining said polymerization reaction mixture at a temperature falling within the range varying between about —60° C. and about —30° C.

9. The product obtained by the process for effecting the polymerization of butene-1, which comprises simultaneously passing butene-1, a solution of aluminum bromide catalyst in a solvent having no deleterious effect on the polymerization reaction, and a promoter for said aluminum bromide catalyst into a polymerization reaction zone to form a polymerization reaction mixture, at rates such that, during the course of the polymerization reaction in said polymerization reaction zone, the mol ratio of promoter to dissolved aluminum bromide catalyst will fall within the range varying between about 0.05 and about 5, and the rate of passage of the butene-1 into said polymerization reaction zone will be not greater than about 4 mols per mol of dissolved aluminum bromide catalyst per minute; maintaining said polymerization reaction zone at a temperature falling within the range varying between about —45° C. and about —10° C.; discontinuing the passage of said solution of aluminum bromide catalyst and of said promoter into said polymerization reaction mixture; passing additional amounts of said butene-1 into said polymerization reaction mixture at a rate not greater than about 4 mols per minute per mol of aluminum bromide catalyst present in said polymerization reaction mixture; and maintaining said polymerization reaction mixture at a temperature falling within the range varying between about —45° C. and about —10° C.

10. The product obtained by the process for effecting the polymerization of butene-1, which comprises simultaneously passing butene-1, a solution of aluminum bromide catalyst in a solvent having no deleterious effect on the polymerization reaction, and a promoter for said aluminum bromide catalyst into a polymerization reaction zone to form a polymerization reaction mixture, at rates such that, during the course of the polymerization reaction in said polymerization reaction zone, the mol ratio of promoter to dissolved aluminum bromide catalyst will fall within the range varying between about 0.08 and about 1.2, and the rate of passage of the butene-1 into said polymerization reaction zone will be not greater than about 2.5 mols per mol of dissolved aluminum bromide catalyst per minute; maintaining said polymerization reaction zone at a temperature falling within the range varying between about —40° C. and about —25° C.; discontinuing the passage of said solution of aluminum bromide catalyst and of said promoter into said polymerization reaction mixture; passing additional amounts of said butene-1 into said polymerization reaction mixture at a rate not greater than about 2.5 mols per minute per mol of aluminum bromide catalyst present in said polymerization reaction mixture; and maintaining said polymerization reaction mixture at a temperature falling within the range varying between about —40° C. and about —25° C.

CELESTE M. FONTANA.

REFERENCES CITED

The following references are of record in the file of this patent:

UNITED STATES PATENTS

| Number | Name | Date |
| --- | --- | --- |
| 2,142,980 | Huijser | Jan. 3, 1939 |
| 2,143,566 | Moser | Jan. 10, 1939 |
| 2,315,080 | Reid | Mar. 30, 1943 |
| 2,318,719 | Schneider et al. | May 11, 1943 |
| 2,379,728 | Lieber et al. | July 3, 1945 |
| 2,447,313 | Carmody et al. | Aug. 17, 1948 |
| 2,484,384 | Levine et al. | Oct. 11, 1949 |
| 2,490,578 | Carmody | Dec. 9, 1949 |
| 2,525,787 | Fontana et al. | Oct. 17, 1950 |
| 2,525,788 | Fontana et al. | Oct. 17, 1950 |